United States Patent [19]

Vinciguerra

[11] 4,248,915
[45] Feb. 3, 1981

[54] PROCESS FOR APPLYING A THICK INSET OF ANTIFRICTION RESINS ON A SURFACE

[75] Inventor: Costantino Vinciguerra, Florence, Italy

[73] Assignee: Nuovo Pignone S.p.A., Florence, Italy

[21] Appl. No.: 52,505

[22] Filed: Jun. 27, 1979

[30] Foreign Application Priority Data

Jul. 5, 1978 [IT] Italy .............................. 25354 A/78

[51] Int. Cl.³ ............................................ B44D 1/092
[52] U.S. Cl. .................................. 427/292; 427/327; 427/375; 428/422; 29/DIG. 23; 29/527.4
[58] Field of Search ............... 427/292, 327, 328, 375; 428/422; 29/DIG. 23, 527.4, 469.5

[56] References Cited

U.S. PATENT DOCUMENTS

| 2,285,583 | 6/1942 | Jenning et al. | 29/527.4 |
| 2,314,902 | 3/1943 | Shepard | 427/292 |
| 3,008,601 | 11/1961 | Cahne | 428/422 |
| 3,389,749 | 6/1968 | Towns et al. | 428/422 |

FOREIGN PATENT DOCUMENTS

| 881175 | 11/1961 | United Kingdom | 427/327 |
| 1015036 | 12/1965 | United Kingdom | 427/292 |

Primary Examiner—Ralph S. Kendall
Attorney, Agent, or Firm—Morgan, Finnegan, Pine, Foley & Lee

[57] ABSTRACT

A process is disclosed for applying a thick inset of an antifriction or a thermosetting resin on a metallic surface, comprising the steps of forming a set of parallel and adjoining grooves on said metallic surface, jumping-up alternately the intergroove ridges in order to extend the anchorage surface for the resin and sintering the resin, such as Teflon, on the metallic surface which has been so prepared.

8 Claims, 7 Drawing Figures

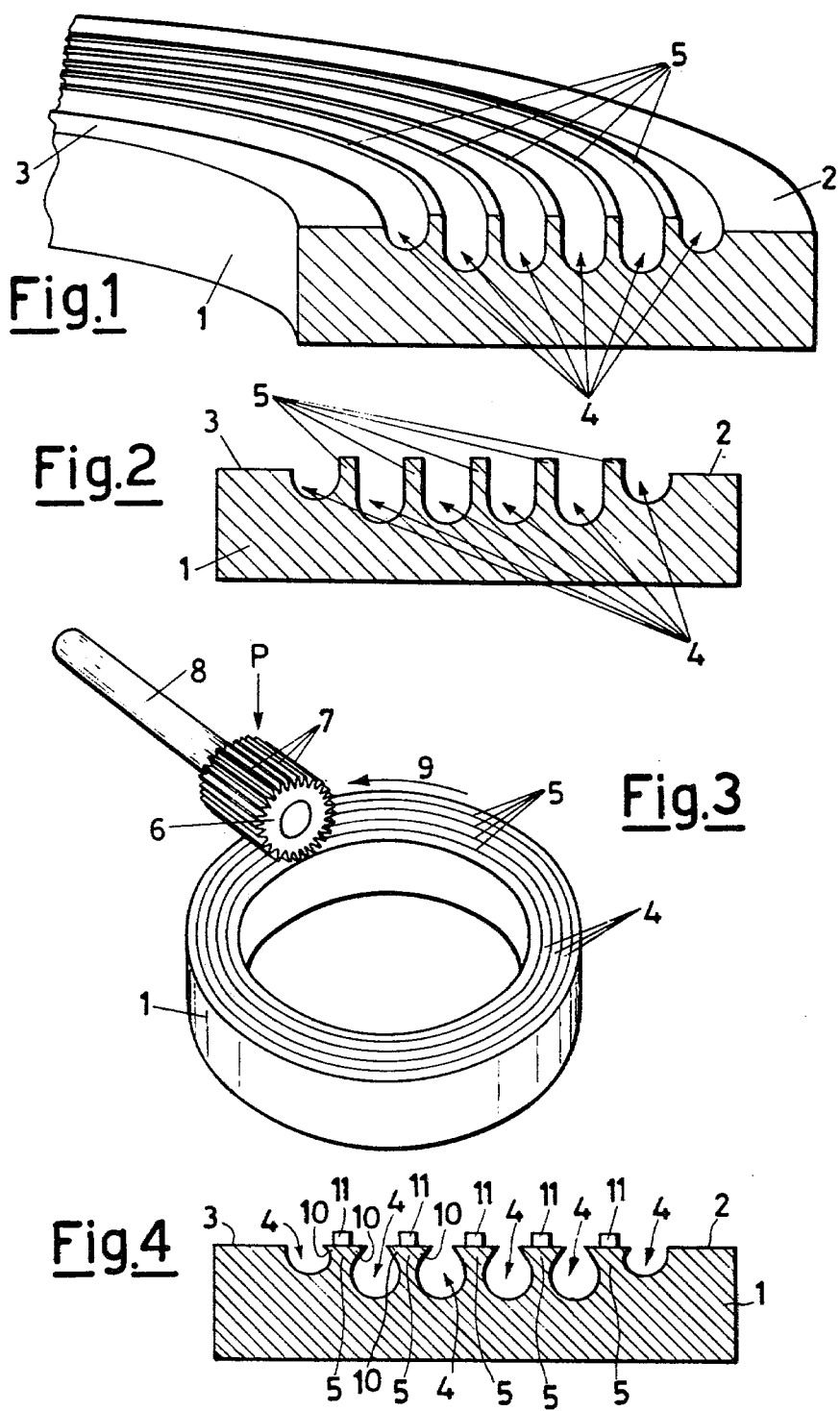

PROCESS FOR APPLYING A THICK INSET OF ANTIFRICTION RESINS ON A SURFACE

This invention relates to a novel method by which it becomes possible to apply a thick and sturdy inset on a surface, the inset being made of an antifriction resin, more particularly PTFE, or polytetrafluoroethylene, best known as TEFLON.

As is known, Teflon is, at present, the material which is most widely used for reducing the friction coefficient deriving from the direct contact between two metallic surface in relative motion relative to one another. On the other hand, since it has proven virtually impossible to cement pure Teflon onto a metallic surface, such a material must be inserted and fastened onto said metallic surface by a mechanical anchorage means.

The present state of the art suggests a number of procedures for providing a mechanical fastening between the background material and the inset material. All these conventional procedures are directed to provide, by chemical etching or sandblasting or by sintering a few layers of bronze spherules, rough or granulated spots on the surfaces intended to receive the inset, said rough spots enabling the sintered inset material applied thereto to stick to the background surface and to anchored thereto.

Among all the above recalled methods, the most efficient has proven to be the one exploiting the sintering of bronze spherules. According to this conventional approach, there are formed, on the surface intended to receive the inset, tiny cylindrical and accurately honed holes which are then uniformly filled with bronze spherules: the latter are subsequently sintered by bringing the whole assembly to a temperature of about 800° C., whereafter Teflon is sintered on the thusly prepared surface and, by creeping among the tiny interstices now provided between the sintered bronze spherules, Teflon becomes mechanically secured to the background surface.

Such a procedure, however, suffers from a considerable drawback which is the comparatively unreliable anchorage provided between the background material and the inset material. The first defect is that, due to the large difference between the expansion coefficient of Teflon and those of the metals upon which it is currently applied and also on account of the circumstance that the Teflon lined workpieces are generally required to work at temperatures from 100° C. to 200° C., it is virtually impossible to apply Teflon insets having a thickness of more than 1 or 2 tenths of a millimeter to prevent the occurrence of inset breakway.

On the other hand, it is not possible to apply an inset of "filled" Teflon, that is, an admixture of Teflon and metallic particulates which is certainly a sturdier and more consistent material than Teflon alone and, moreover, it is not possible to machine a workpiece with an inset of such a modified Teflon. Lastly, in addition to a rather high cost of the procedure due to the requirement of using a considerable quantity of bronze spherules, the inset can applied only to a not too wide number of materials, that is, it can be applied only to those backgrounds which are capable of standing the high temperatures (about 800° C.) which are required to carry out sintering of the bronze spherules.

An object of the present invention is to do away with the shortcomings enumerated hereinabove by providing a novel procedure by which a sturdy mechanical anchorage is originated between the background and the inset materials.

This procedure, according to a feature of the invention, comprises the steps of forming on the metal surface onto which the Teflon inset is to be applied, a set of parallel adjoining grooves, effecting a cold jumping-up operation on alternately sequential spots of the ridges which divide a groove from its next ones in the longitudinal direction of the grooves and finally sintering on the surface so machined the Teflon inset.

According to a preferred embodiment of the invention, the set of parallel and adjoining grooves is lathe-machined.

According to an alternative preferred embodiment of the invention, the alternate jumping-up in the cold on the inter-groove ridges is performed by having the metal surface concerned running under a roller equipped with longitudinal axial knurls, which is thrust against the ridges so as to imprint those with its knurls positioned transversally of the grooves of the metal suface.

The advantages achieved with such a procedure are apparent. In the first place, a considerable economy is achieved as non bronze spherules are used and, therewith, it becomes now possible to apply the inset on a wider number of materials for the background since it is no longer required to attain temperatures as high as 800° C. for sintering the bronze spherules, it being only necessary to attain temperatures in the order of 400° C. for sintering Teflon alone, or filled Teflon. On the other hand, since the inset material is now allowed to creep into comparatively wide grooves or splines and is efficiently held in position by the stubs and the undercut projections in the interior of the grooves, as originated by the alternate jumping-up of the groove ridges, the inset forms virtually an entity with the background material. Thus, not only the inset filled Teflon becomes now possible, along with the machining of the composite workpiece thus obtained, but comparatively high temperature can be obtained without incurring in the risk of an inset breakaway, so that considerably thick inset can now be provided, in the order of a few millimeters, that is, about ten times multiples of those obtainable heretofore with the aid of the conventional art.

Last, but not least an advantage, the presence of the ridges jumped-up alternately slightly below the exposed face of the inset contributes very efficiently to dissipating the heat built up during the work of the composite piece.

On the other hand, the foregoing makes it possible to understand very clearly that the provision of a fully satisfactory mechanical union between the Teflon (also filled Teflon) inset and the background is a function, and considerably, of the design of the grooves as to their width and depth and also the inter-groove gap and thus, in summation, of the thickness of the ridges.

As a matter of fact the size of the grooves dictates the quantity of Teflon which can be left inserted therein: this amount, of course, should not be too small in order to impair an effective hook-up, nor should it not be too large in order to prevent inset material waste and to be enable to form on the background material an appropriate number of grooves. In addition, the thickness of the ridges must be such as to make it possible to obtain, in a reliable way, undercut protrusions in the interior of the ridges rather than a mere bending thereof: the latter occurrence would be probable if the ridges were too slim.

Now, it has been found by field tests that, to obtain a very satisfactory adherence of the inset to the background, the optimum value for the thickness, s, of the ridges may vary between 0.01 mm to 0.2 mm up to 1 mm approximately, consistently with the thickness of the inset to be provided, and that the dimensions of the ridges must be a function of the thickness, s, of the ridges.

More precisely, the grooves must have a depth comprised between 3.5 and 4.5 times the thickness, s, of the ridges, and a width comprised between 2.5 to 3.5 times the thickness, s, of the ridges.

The invention will now being illustrated with reference to the accompanying drawings which show a preferred embodiment of practical type, given by way of example only without limitation, since technical or constructional modifications and changes are always possible without departing from the scope of this invention.

In the drawings, which show the case of an inset applied to the annular portion of the top planar surface of a toroidal ring having a rectangular cross-section.

FIG. 1 shows, in a fragmentary perspective view, the toroidal ring on the top surface of which annular grooves are formed according to the method of this invention.

FIG. 2 shows a front cross-sectional view of the toroidal ring which is grooved as in FIG. 1.

FIG. 3 is a diagrammatical perspective view depicting the alternate jumping-up cold procedure for the ridges placed between adjoining grooves of the toroidal ring, by the help of a knurled tool according to a preferred embodiment of the method of the invention.

FIG. 4 is a front cross-sectional view of the toroidal ring of FIG. 5.

Figure 5:
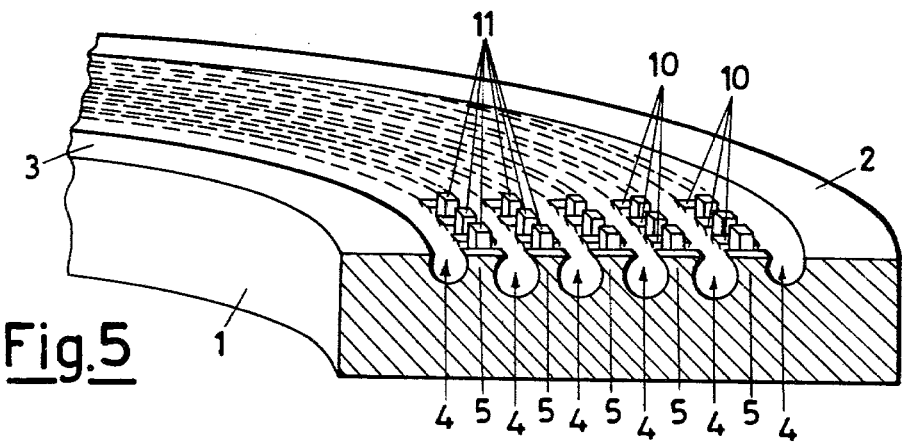
FIG. 5 shows a fragmentary perspective view of the toroidal ring of FIG. 1 showing the intermittently spaced depressions on the ridges.
Figure 6:
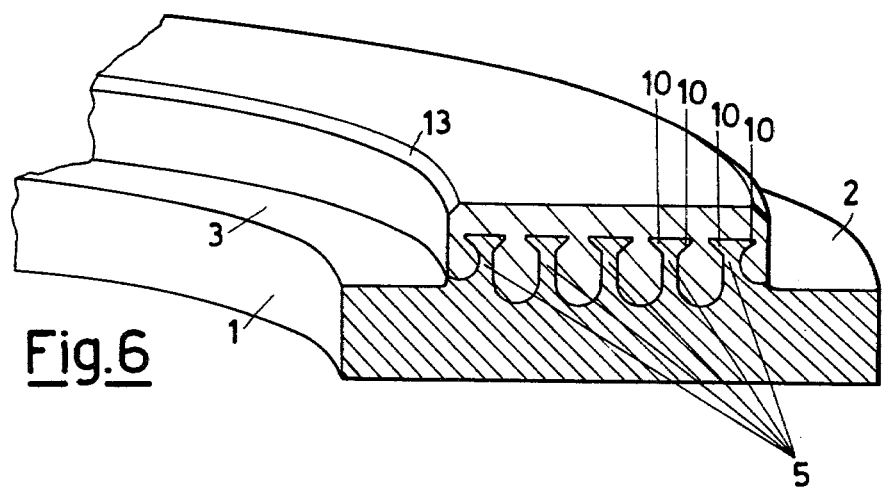
FIG. 6 shows a fragmentary perspective view of the toroidal ring having a Teflon inset applied thereto by the method of this invention, the cross-section having been taken in correspondence with a jumping-up of the ridges.
Figure 7:
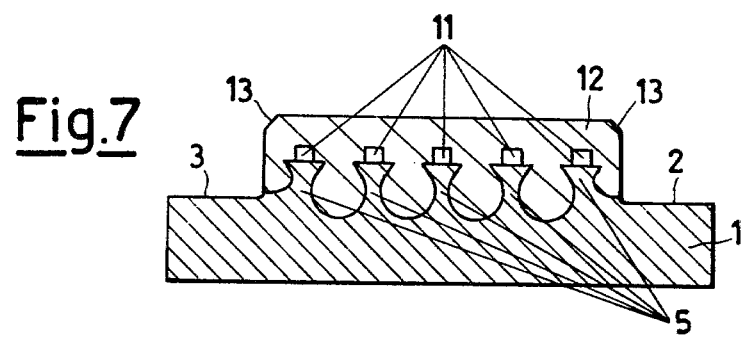
FIG. 7 shows a front cross-sectional view of the toroidal ring of FIG. 6, taken in correspondence with an area in which no jumping-up of the ridges has taken place.

With reference to the drawings, the numeral 1 indicates a toroidal ring having a rectangular cross-sectional outline, on an annular portion of the planar top surface of which a layer of Teflon having a thickness of a few millimeters must be applied as an inset, To this purpose, the side edges 2 and 3 of said top planar surface, which are external to the annular portion, are recessed, for example by 0.5 mm, by turning and, still by turning, a set of annular concentrical grooves 4 are formed, having a depth of, say, 2 mm, a width of about 2 mm and are spaced apart from one another by ridges 5 having a thickness of about 0.5. Subsequently, an alternate jumping-up of the ridges 5 is carried out by a roller 6 having longitudinal knurls 7 (best seen in FIG. 3) which, mounted idly on a shaft 8, is maintained pressed by a force P onto said ridges, with the knurls 7 directed perpendicularly to the ridges, while the toroidal ring 1 is caused to rotate thereunder in the direction of the arrow 9. The result of this operation can clearly be seen in FIG. 4 and is an alternate sequence of crushings and absence of crushing in the longitudinal direction of the ridges. The crushings originate projections 10 which overhangly jut in the interior of the grooves 4, and the absence of crushing actions gives rise to sorts of stumps 11. Lastly, on the surface which has been so prepared, pure Teflon, or filled Teflon, 12 is sintered to a thickness of a few millimeters. This inset, by virtue of the excellent adherence to the ring 1, can be also machined as shown in FIGS. 6 and 7, where the Teflon layer is shown smoothed, perfectly squared and with bevels 13.

It is apparent that what has been shown and described has the meaning of a mere indication since any other kind of machining can be adopted to provide the grooves and for the alternate jumping-up of the ridges. In addition, although the present disclosure has been limited to the application of Teflon alone or filled Teflon to planar surfaces, the method of this invention can also be applied to the provision of insects of any other antifriction or thermosetting resin, also on nonplanar surfaces or on surfaces which can also be other than those bodies of revolution.

I claim:

1. A process for applying a layer of an anti-friction resin to a metallic surface comprising:
    (a) forming parallel and adjacent grooves on said surface, said adjacent grooves separated by a ridge;
    (b) jumping-up said ridges to form an alternating series of pushed down sections in which an overhang is formed and sections in which the original height of the ridge is maintained;
    (c) placing a layer of the anti-friction resin on said surface; and
    (d) sintering said layered surface.

2. The process according to claim 1 further comprising forming said alternating sections by contacting said metal surface with a roller having intermittently spaced knurls transverse to said ridges.

3. The process according to claim 1 wherein said ridges have a thickness between about 0.01 mm and 1.0 mm.

4. The process according to claim 3 wherein the thickness of said ridges is between 0.01 mm and 0.2 mm.

5. The process according to claims 1 or 3 wherein said grooves have a depth of between about 3.5 and 4.5 times the thickness of said ridge and a width of between about 2.5 times and 3.5 times the thickness of said ridge.

6. A process for applying a layer of an antifriction resin to a metallic surface compising:
    (a) forming parallel and adjacent grooves on said surface, said adjacent grooves separated by a ridge and having a depth of between about 3.5 and 4.5 times the thickness of said ridge and a width of between about 2.5 times and 3.5 times the thickness of said ridge;
    (b) jumping-up said ridges to form an alternating series of pushed down sections in which an overhang is formed and sections in which the original height of the ridge is maintained with a roller having intermittently spaced knurls transverse to said ridges;
    (c) placing a layer of the anti-friction resin on said surface; and
    (d) sintering said layered surface.

7. The process according to claims 1 or 6 wherein said anti-friction resin is selected from the group consisting of pure polyetrafluoroethylene and filled polytetrafluoroethylene.

8. The process according to claims 1 or 6 wherein said anti-friction resin layer has a thickness of about 2 mm.

* * * * *